United States Patent [19]

Johnson et al.

[11] Patent Number: 4,530,051
[45] Date of Patent: Jul. 16, 1985

[54] PROGRAM PROCESS EXECUTION IN A DISTRIBUTED MULTIPROCESSOR SYSTEM

[75] Inventors: Jerry W. Johnson, Wayne; Wu-Hon F. Leung, Downers Grove, both of Ill.

[73] Assignee: AT&T Bell Laboratories, Murray Hill, N.J.

[21] Appl. No.: 416,649

[22] Filed: Sep. 10, 1982

[51] Int. Cl.³ ............................................. G06F 15/16
[52] U.S. Cl. ............................ 364/200; 179/18 ES
[58] Field of Search ................ 179/18 ES; 364/200, 364/900

[56] References Cited

U.S. PATENT DOCUMENTS 4,256,926 3/1981 Pitroda et al. .................. 364/200 X
4,318,173 3/1982 Freedman et al. .................. 364/200

OTHER PUBLICATIONS

Jovic, Nick et al., "Interprocessor Communication in Systems with Distributed Control", Proceedings of the IEEE, vol. 65, No. 9, Sep. 1977.
Bierman, Eric et al., "Computer Software Controls Modern Telephone Switches", Telesis, Oct. 1979.
R. P. Cook, "*MOD—A Language for Distributed Programming", IEEE Transactions on Software Engineering, vol. SE-6, No. 6, pp. 563–571, Nov. 1980.
P. Brinch Hansen, "Distributed Processes: A Concurrent Programming Concept", Communications of the ACM, vol. 21, No. 11, pp. 934–941, Nov. 1978.
B. J. Nelson, "Remote Procedure Call", Ph.D. Dissertation, Report CMU-CS-81-119, Carnegie-Mellon University, 1981.
A. Z. Spector, "Performing Remote Operations Efficiently on a Local Computer Network", Communications of the ACM, vol. 25, No. 4, pp. 246–260, Apr. 1982.

Primary Examiner—James D. Thomas
Assistant Examiner—David L. Clark
Attorney, Agent, or Firm—Kenneth H. Samples

[57] ABSTRACT

A method and apparatus for executing parts of a program process on two processors of a multiprocessor system. A home process resides in a home processor and is the destination process of all interprocess messages. The home process may call for the execution of a selected procedure on a remote processor. A call message is sent to the remote processor and a remote process is initiated. When the selected procedure has been executed in the remote processor, a return message is sent to the home process and execution of the home process is continued. Interprocess messages to the program process are received by the home processor and are forwarded to the remote processor. Interprocess messages generated by the selected procedure are transmitted by the remote processor, but are tagged with the identity of the home processor and home process.

23 Claims, 9 Drawing Figures

REMOTE PROCESSOR MEMORY LAYOUTS

HOME PROCESS STATES

REMOTE PROCESS STATES

PROGRAM PROCESS EXECUTION IN A DISTRIBUTED MULTIPROCESSOR SYSTEM

TECHNICAL FIELD

This invention relates to the execution of programs in a multiprocessor system and more specifically, to the execution of program processes in a multiprocessor system.

BACKGROUND OF THE INVENTION

A data processing system carries out its overall objective by executing a number of tasks called program processes. If the data processing load is so large that a single processor cannot perform all of the required program processes, a multiprocessor system, using several processors operating in parallel, is frequently used. In a multiprocessor system, several data processors are executing programs associated with different program processes simultaneously.

A distributed multiprocessor system comprises at least two processors, each of which directly accesses an associated local random access memory to read data and instructions required to control the data processing operations; however, there is no random access memory directly accessible by all processors. When two processors in a distributed multiprocessing system communicate, they do so by data messages carried over a suitable interconnection medium such as a data link. This is in contrast to a non-distributed multiprocessor system in which processors may access some common shared memory and transmit data to each other through this common memory facility.

When two processes in a system need to communicate with each other, they normally do so via data messages, even when the two processes reside on the same processor. This makes it possible to have the same software communications interface between two processes on different processors as between two processes on the same processor.

A program process consists of a number of different subtasks, called procedures. In prior art distributed multiprocessing systems, a process is executed on a single processor. This simplifies the task of invoking or calling for the execution of the different procedures required to execute a process. An advantage of the prior art solution is that no intraprocess messages need be sent among different processors.

However, the restriction of a program process to a single processor in a distributed multiprocessor system, also creates difficulties. For example, in a system in which some program procedures are common to program processes executed on many different processors, the procedures must either be replicated in the random access memories of many processors, or paged from bulk memory into the random access memories of these processors as needed. Storage in random access memory is expensive, and in real time systems requiring rapid response to external stimuli, paging may not be a feasible alternative because the required response time of the system cannot be achieved. Further, if the system included special processors, such as processors designed for making numerical calculations rapidly, it would be an advantage to be able to execute selected program procedures on these special processors.

For example, in the case of a distributed telephone switching system, many customer interface module processors execute the process of setting up a telephone call. While it is efficient to store and execute the process of setting up a simple telephone call in each customer interface module processor, it is uneconomical to store in each interface module processor the many complex, specialized, and infrequently used procedures associated with specialized calls, such as conference calls. Breaking up the basic telephone call process into a number of cooperating processes is also unsatisfactory since this incurs a large overhead occasioned by the additional communications among these processes, and introduces delays in the call set-up time.

It is an object of the present invention to permit execution of a process by two or more processors in a real time environment without substantial increase in system overhead.

SUMMARY OF THE INVENTION

In accordance with the present invention, a program process is executed on two or more processors. A process, called the subject process, is initiated on a first processor. The first processor then generates and transmits procedure call data, specifying the arguments needed to execute a selected procedure, to a second processor. The second processor then executes the selected procedure and generates and transmits return data including any data generated by the selected procedure back to the first processor. Execution of the subject process is then continued on the first processor. While the second processor is executing the selected procedure, the first processor receives interprocess messages from other processes to the subject process.

In accordance with one embodiment of the invention, execution of the subject process starts in a home processor or is transferred to a home processor as soon as the existence of the process is made known to outside processes. When a program procedure within the subject process is to be executed by a remote processor, the home processor executes a remote procedure call to initiate the remote process in that remote processor. Data is transmitted to that remote processor to call for the execution of the remote procedure and to pass arguments necessary for execution of that procedure. The subject process is then executed on the remote processor as a remote process and goes into a remoting status in the home processor. The subject process is in the active status, i.e., executing, or awaiting messages or resources in order to continue execution, on only one processor at a time. When the subject process is in the remoting status in the home processor, the subject process in the home processor is still responsive to message from the remote processor, including return messages and messages requesting that a message from any outside process be sent on to the remote processor. After the remote processor has finished executing the remote procedure, it transmits a return message to the home processor including any data generated by the procedure. Program execution is then continued on the home processor. As the subject process continues to be executed, it may subsequently initiate calls for the execution of another program procedure on the same or another remote processor. Further, the remote processor while executing the subject process can make a procedure call to the home processor. Advantageously, this arrangement permits the assignment of procedures requiring specialized resources for efficient execution to be assigned to processors having ready access to such resources.

Additionally, there is no need for other processes to know of the identities of the mremote processor or process. While the process is in the remoting status in the home processor, messages from other processes to the subject process are received by the home processor and are stored there. Such messages are transmitted to the remote processor currently executing the subject process, either on demand, or as received, or as received but selectively filtered by categories such as process source, subject process state, and/or type of message. Advantageously, this arrangement permits other processes to be executed as if the subject process were executed only in the home processor.

Assignment of a given procedure to be executed on a given processor frequently poses a difficult design decision. Advantageously, procedures may be designed to be executed by the home processor and may subsequently be adapted for execution by a remote processor. In accordance with one aspect of this invention, this is accomplished by modifying the program text of the subject process to change program calls for execution of a selected procedure to program calls for remote processor execution of that procedure, to modify the program text of the selected procedure to use certain operating system services in the home processor, and to include the program text of the selected procedure with the program text of the remote processor.

In one embodiment of this invention, the distributed multiprocessor system is the control means for a telecommunications switching system. Each of a plurality of interface module processors control switching operations associated with a particular group of customer facilities. A central processor is also provided and is used to execute common system processes. Such a central processor is adapted to execute specialized and less frequently executed program procedures for processes controlled by interface module processors. Advantageously, such procedures need only be stored in the central processor and need not be replicated in each interface module processor.

BRIEF DESCRIPTION OF THE DRAWING

A more complete understanding of the present invention may be obtained from a consideration of the following description when read in conjunction with the drawing in which.

DETAILED DESCRIPTION

Figure 1:
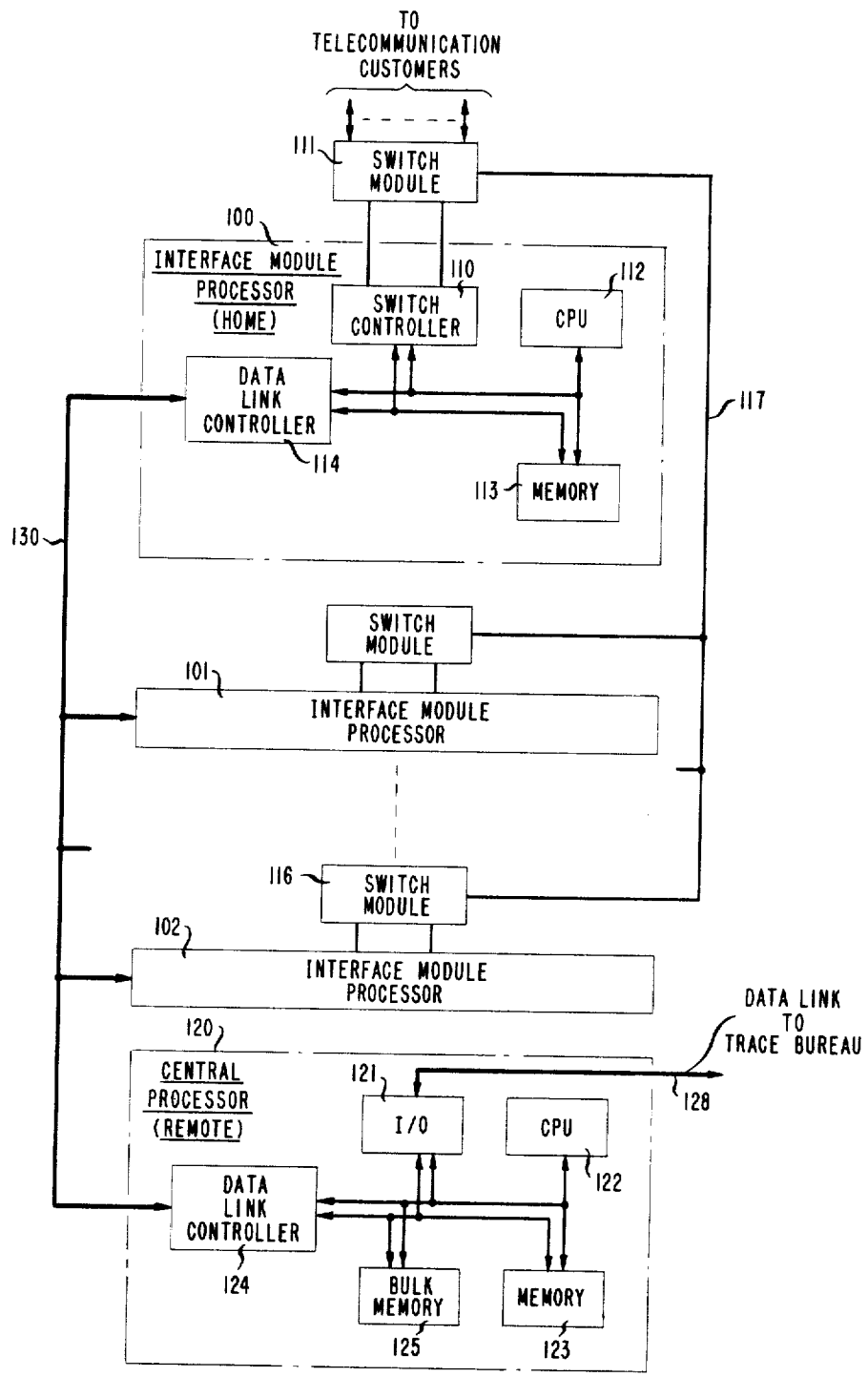
FIG. 1 is an overall block diagram of the control system of a telecommunications switching system.

FIG. 1 is a block diagram of an illustrative distributed multiprocessor system, which is the control system of a telecommunications switching system. The multiprocessor system comprises a number of essentially identical interface module processors of which three are shown (100, 101, 102), and a central processor 120. The interface module processors, e.g., 100, include a switch controller 110 connected to a switch module 111 which in turn is connected to a group of telecommunication customers. Switch module 111 operates under the control of switch controller 110 and a central processing unit 112 to interconnect the telecommunication customers. Additionally, the switch modules, e.g., 111, of the interface module processor are interconnected by a communications medium 117, the nature of which is unimportant to the present invention, to permit the interconnection of telecommunication customers connected to different switch modules. Processor 120 is a central processor available to perform data processing operations needed by the interface module processors 100–102. Central processor 120 is not connected to a switch module but is connected to input/output equipment by an I/O interface 121. In addition, processor 120 has bulk memory 125 such as a magnetic disk to store some of the less frequently used system data. Each processor of the present embodiment includes a central processing unit (CPU) (112, 122) and a random access memory (113, 123). A data link controller (114, 124) attached to a data link (130) is provided to convey messages between processors.

The data processing task of a processor is accomplished under the control of the CPU such as 112, 122. The CPU's 112, 122 read program instructions previously stored in memory 113, 123, respectively, and execute the instructions in order to read and process data previously stored in the same memory, and to store the processed data back in that memory. The CPU's 112, 122 also control data link controllers 114, 124, respectively, in accordance with instructions and data read from memories 113, 123, respectively. These data link controllers are connected to a data link 130 which is used for conveying data messages between processors. The data link controllers 114, 124 also have direct access to the memories 113, 123, respectively, to allow messages to be read from or loaded into these memories directly. Switch controller 110 of interface module processor 100 also has direct access to memory 113 to allow the switch controller to insert data into or read data from that memory directly. CPU 122 of central processor 120 also controls bulk memory 125 and I/O controller 121; these units also have direct access to memory 123 to allow them to insert data into or read data from that memory directly.

The overall data processing task of the system is broken down into a number of major tasks called program processes. Each such program process is executed by executing a number of program procedures. Program procedures are controlled by program instructions which make up such programs in order to process data, and to control switch controllers, data link controllers, I/O controllers and bulk memories.

A process comprises a collection of procedures, each performing some subtask of the process. Associated with a process is a block of memory called a process control block which stores data applicable to the entire process, and a block of memory called a stack which stores data useful to the individual procedures of the process. Individual procedures within a process and a processor are normally called by loading the stack with data needed by the procedure, and executing a program transfer instruction to jump to the initial step of the procedure. The procedures of a process all share the process control block and stack. Data is exchanged between procedures of a process via the stack. A process normally executes only one task on only one processor at a time. If it is important that two tasks be executed simultaneously, it is normally necessary to create two processes to execute these tasks.

Processes communicate with each other via messages. The same type of message is normally used in communicating with another process in the same processor, or another process in a different processor. Usually, a substantial overhead is associated with the preparation, transmission, reception, queuing, and interpretation of messages. This overhead is much greater than that required to communicate between procedures within a process. Note that while transmission and reception is not required for messages between processes executed in the same processor, preparation, interpretation, and message queuing are still required. System tasks are normally allocated to different program processes so as to minimize interprocess communications and so as to communicate most interprocedure data via the more efficient intraprocess procedure calls.

The following is an example of the operation of the system of FIG. 1. A subject process, initiated in processor 100, called the home processor, calls for the execution of a procedure by processor 120, called the remote processor. Data exchanged between that portion of the subject process executed in the home processor, called the home process, and that portion executed in the remote processor, called the remote process, is conveyed over data link 130. Subject process data associated with the home processor is stored in memory 113 and subject process data associated with the remote processor is stored in memory 123. CPU 112 controls the execution of home process procedures, and CPU 122 controls remote process procedures.

Figure 2:
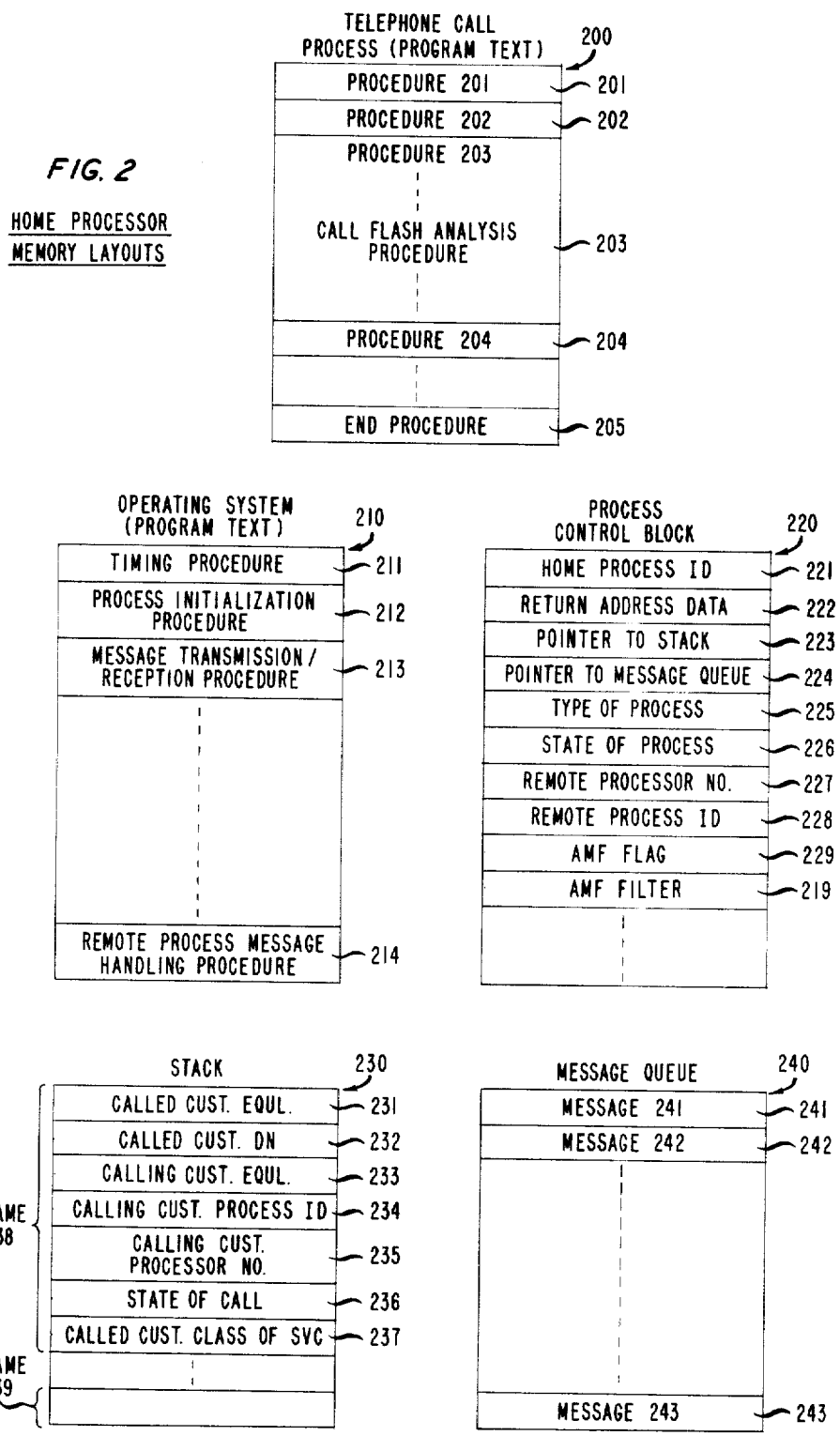
FIGS. 2 and 3 depict blocks of memory in a home processor controlling the execution of a process, and a remote processor executing a procedure of that process, respectively.

During the execution of the subject process other processes in other processors may need to communicate therewith. Such communication may actually be intended for the procedure performed by the remote processor. In accordance with the present embodiment, the other processes need only know the identities of the home processor and process. No complex system for keeping track of the remote processors and processes involved needs to be maintained to implement interprocess communication. A process which is to communicate with the subject process transmits a message to the home processor of the subject process without regard to other processors involved. The home processor, by arrangements described later herein, determines when messages from other processes should be sent to the remote processor and sends them accordingly. Also, a remote processor may need to communicate with other process during the execution of the subject process. The remote processor of the present embodiment, has the ability to transmit messages to other processes which messages identify the home process and home processor as the source of the messages. Thus, responses to messages will be returned to the home processor which can determine their eventual destination. FIG. 2 includes a memory block 200 which stores the program text of a called customer telephone connection process. (For ease of understanding, procedures and data occupying a memory block or a location within that block are referred to by the number of that memory block or location.) Memory block 200 stores a number of procedures 201–205. These procedures accomplish the different subtasks of the basic telephone call process. One of these procedures (203), calls for the execution of a remote procedure 250 (FIG. 3) which is to be executed in a remote processor.

Each process has an associated process control block, e.g. block 220. The block 220 includes a process identification number 221, a return address 222 specifying the location of the program to be resumed when the process is continued following a pause in its execution, a pointer 223 to a memory stack 230 used for storing variables required for process execution, a pointer 224 to a message queue 240 which accumulates messages to the process, a process type indicator 225, an indicator 226 of the current state of the process, and a remote processor number 227.

The stack 230 is broken up into units called frames, e.g., 238, . . . , 239. The most recently used frame of a stack, in this case, 238, called the last frame, stores variables required by a procedure to be invoked. When is frequently convenient to transmit the last frame of a stack as part of the data of a remote procedure call message.

The home processor 100 also stores an operating system program 210. This is a separate process generally invoked for services by all other program processes in that processor. The operating system provides these services utilizing procedures such as a timing procedure 211, process initialization procedure 212, message handling procedure 213, and a remote process message handling procedure 214. The process initialization procedure 212 assigns a process identification number, e.g., 221, as each process is initiated. The use of processes, associated memory stacks and process control blocks, operating systems and interprocess messages is well-known in the art.

Processes communicate with each other via interprocess messages which are placed in message queues such as message queue 240, which contains messages 241, 242, . . . , 243. These queues operate on a first-in, first-out queuing discipline in this example. Other queuing disciplines are well known in the art and could also be used in other applications. The interprocess messages come from other processes in the same processor and from other processors via data link 130. For example, a process executing on processor 102 may need to send a message to the subject process which is executing on processor 100. The process executing on processor 102 calls the operating system of processor 102, which sends the message on data link 130 to processor 100. The operating system of processor 100 receives this message and places it in message queue 240.

The remote processor (central processor 120) also has a number of memory blocks (FIG. 3) associated with process execution. These memory blocks include program text 250 for a remote procedure, a remote process control block 270, a stack 280, a message queue 290, and an operating system 260. The process control block 270 of the remote processor includes the remote process identification number at location 271, a return address pointer at location 272 indicating where programs which are temporarily placed in a wait state are to be resumed, a pointer to stock 280, which contains arguments passed as part of the remote procedure call message, at location 273, a pointer to message queue 290, for accumulating messages forwarded by the home processor, at location 274, the process type indicator at location 275, the identification of the home process at location 278, the identification of the home processor at location 277, and the process state at location 276. The remote process is initiated by the operating system 260 of the remote processor. The remote process identification 271 is assigned by the operating system of the remote processor when the remote process is initiated. The different uses of these blocks of memory will become more apparent when the state diagrams of a home process (FIGS. 4, 5) and remote process (FIGS. 6, 7) are considered.

FIGS. 4 through 7 are state diagrams illustrating the execution of a subject process in a home processor and a remote processor. The home processor is the processor on which the subject process is initiated. Remote processors are called in to execute particular procedures within the process as needed. The home process stays alive for the life of the subject process even while procedures are being executed remotely. In alternative embodiments of this invention, the subject process could be initiated in any processor and transferred to the home processor before the subject process first receives or transmits messages from or to other processes; the home processor must be assigned before then so that it receives all messages to the subject process.

Figure 4:
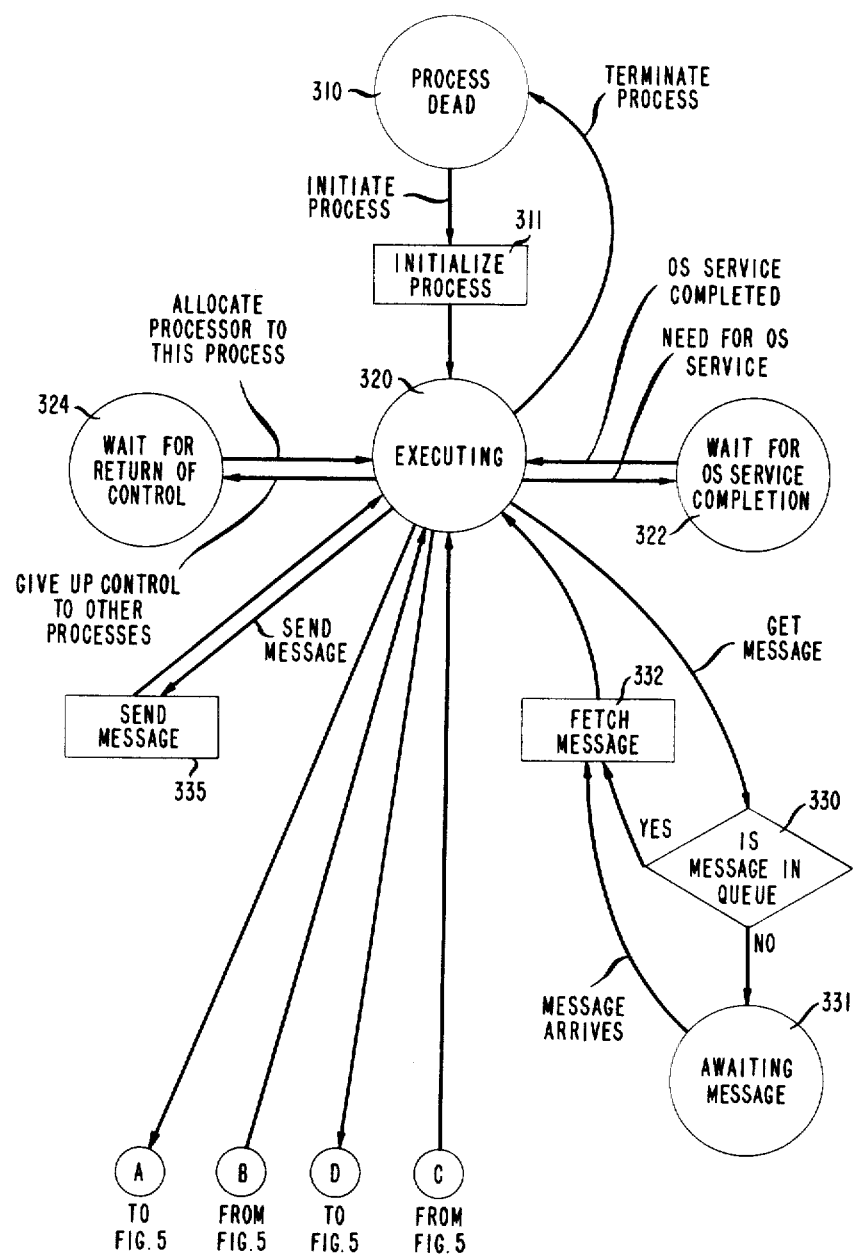
FIGS. 4 and 5 are state diagrams of process state, transitions, and actions in the home processor.

FIG. 4 shows a portion of the states and transitions required for the execution of a subject process. Collectively, the executing and waiting states, and actions and transitions associated with the execution of a process on a processor are called the active status. A subject process is initially dead (state 310) until a request to initiate this process is acted on by the operating system of the processor. In response to an initiation request, the operating system initializes the process (action box 311) by initializing the process control block 220, and allocating a stack 230 and a message queue 240. Thereafter, the process goes to the executing state 320. When a process is in the executing state 320 and there is a need to give up control of the processor to other processes the process goes into a "wait for return of control" state 324 until control of the processor is reallocated to the process and execution is continued. If in the course of executing the process, a need is recognized for an operating system (OS) service, such as the need to acquire bulk storage space, or to await the satisfaction of a condition such as the lapse of a timed interval, the process goes into a wait state 322 until the OS service has been completed. At that time, the execution state 320 is resumed. When a message must be sent by an executing process, the process requests the services of the operating system to send the message (action box 335), after which the process returns to the executing state (320). Also, while executing, the subject process may recognize the need to process a message from another process. Such messages would be queued by the operating system. The process first determines in step 330 if a message is present in the queue 240 (FIG. 2). When such a message exists in the queue, the message is fetched (action box 332) and execution continues. When no message is present in the queue, the process goes into the "awaiting message" state 331. As soon as a message has been queued for the process, it is fetched (action box 332) and execution continues.

Figure 5:
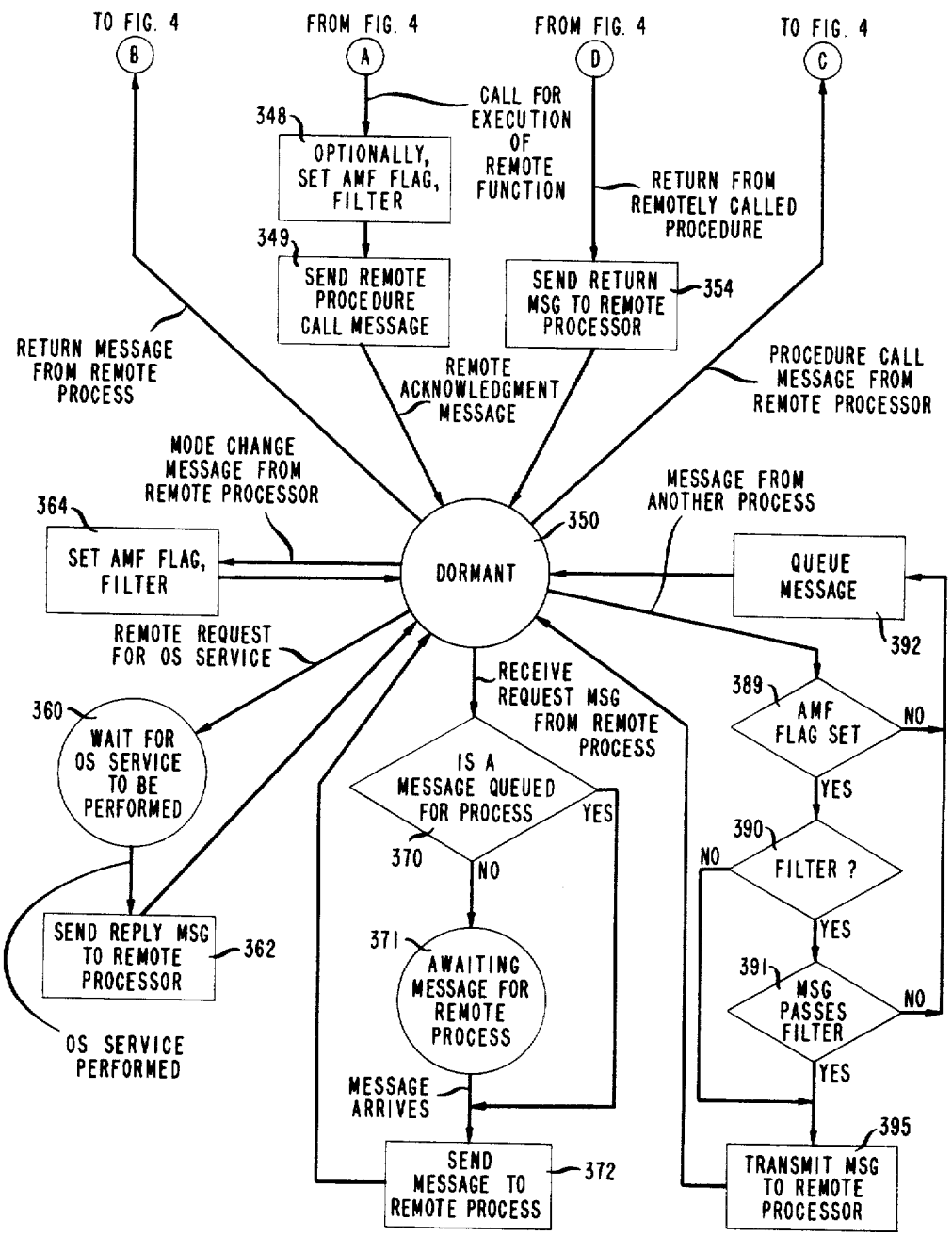

FIG. 5 shows additional home process states required to permit a procedure of the subject process to be executed on a remote processor. Such a procedure is invoked using a remote procedure call, and returns to the home process via a remote procedure return. While in the executing state 320, (FIG. 4) the subject process may recognize at the transition labeled A (FIG. 4), the need to call for a procedure which is to be executed on the remote processor. The home processor transmits (action box 349, FIG. 5) a remote procedure call message (510, FIG. 8) to the remote processor to initiate a remote process and to pass data required by the remote procedure. The number of the remote processor is recorded in location 227 (FIG. 2) of process control block 220. As will be discussed later herein, the remote processor transmits an acknowledgment message (520, FIG. 8) in response to the procedure call message. When the home process receives the acknowledgment message from the remote process, the identity of the remote process contained in the acknowledgment message, is recorded in location 228 of process control block 220. The home process then goes into dormant state 350. This dormant state is one of the states of the remoting status, i.e., collection of states and actions of the home process while the process is executing or waiting in the remote process. Eventually, while in dormant state 350, the home process will receive a return message (530, FIG. 8) from the remote process indicating that execution of the called program procedure is complete and returning any data which may have been generated by the called procedure. Process execution is then resumed on the home processor by a transition to executing state 320 (FIG. 4) via the transition labeled B.

While the home process is in the remoting status, the operating system of the home processor receives messages from outside processes to the subject process and queues these messages in the message queue 240 (FIG. 2). If a request message is received from the remote process requesting a message queued by the home process while the home process is in dormant state 350, a test 370 is performed to see if any messages are in the queue 240 (FIG. 2). If so, the message is sent (action box 372) to the remote process. If not, the home process is primed to await messages by going into an awaiting message for remote process state 371. The home process exits from this state as soon as a message is received and that message is sent (action box 372) to the remote process.

Message forwarding on demand, i.e., in response to a request message from the remote processor, is appropriate for many situations. This arrangement permits messages to be processed under scheduling control of the remote processor. In some situations, however, it is known in advance that all messages, or all messages in some category, are directed to the remote process. Accordingly, an arrangement is provided in the present invention to perform automatic message forwarding (AMF). In the AMF mode, the home process sends messages to the remote process as soon as they are received; the messages are stored in message queue 290 (FIG. 3) by the operating system of the remote processor. AMF can be established initially at the time the remote procedure is called. In addition, a remote process can start executing in the message forwarding on demand mode, and can switch to the AMF mode by sending a mode change message, (530, FIG. 8) to the home processor. In the AMF mode, it is possible to arrange to transmit only certain defined categories of messages to the remote process and to queue other messages in the home processor. In this example, the category used to select or filter messages in the AMF mode is the combined identifications of the message source processor and process.

Automatic message forwarding (AMF) is invoked by setting an AMF flag in location 229 of the home process control block 220 (FIG. 2). Filtering for AMF is invoked by defining in the AMF filter, location 219, the category to be transmitted. The AMF flag and filter can be set initially (action box 348, FIG. 5) as one of the steps of making a remote procedure call, or in response to a mode change message (action box 364). The mode change message, which includes the AMF filter data, is sent when the remote process requests a change from the message forwarding on demand mode to the AMF mode.

In order to process messages in the AMF mode, it is necessary to check the AMF flag, via test 389, whenever a message is received by the home process in the dormant state 350. If the AMF flag is not set, the message is queued (action box 392) in message queue 240 (FIG. 2). If the AMF flag is set, test 390 is performed to see if there is any data in the AMF filter 219 (FIG. 2). When there is no data in the filter, corresponding to the "no" output of test 390, the message is transmitted to the remote processor (action box 395). When there is data in the AMF filter corresponding to the yes output of test 390, that data is matched (test 391) against the source processor and process identifications of the message. When there is a match, corresponding to the "yes" output of test 391, the message is transmitted to the remote processor (action box 395); when there is no match, the message is queued (action box 392) in message queue 240 (FIG. 2).

Many categories can be used to define a filter. For example, it may be desirable to forward only certain types of messages (e.g., timing messages). Alternatively, it may be desirable to forward messages only if the process is in certain states (e.g., beyond the first phase of the process). The filtering mechanism can be made flexible according to the needs of a particular application, using techniques well known in the prior art.

The home processor provides some operating system (OS) services to the remote process. Such services include the acquisition or release of resources, or the satisfaction of certain conditions. One example of the satisfaction of a condition is the lapse of a time interval. Since it is very difficult to keep time records between two processors in a distributed multiprocessor system in exact synchronism, it is advantageous to have a single source of time indications. This single source is the operating system of the home processor. Whenever a remote procedure requires a timing indication, it is provided from the home processor. Similarly, when resources must be allocated to the process, these resources are allocated from the home processor. The home processor OS service is requested via a message from the remote processor, to which the home process responds by going from its dormant state 350 to state 360. When the service has been performed, a message returning any required variables is sent (action box 362) to the remote processor and the home process goes back to dormant state 350.

Figure 6:
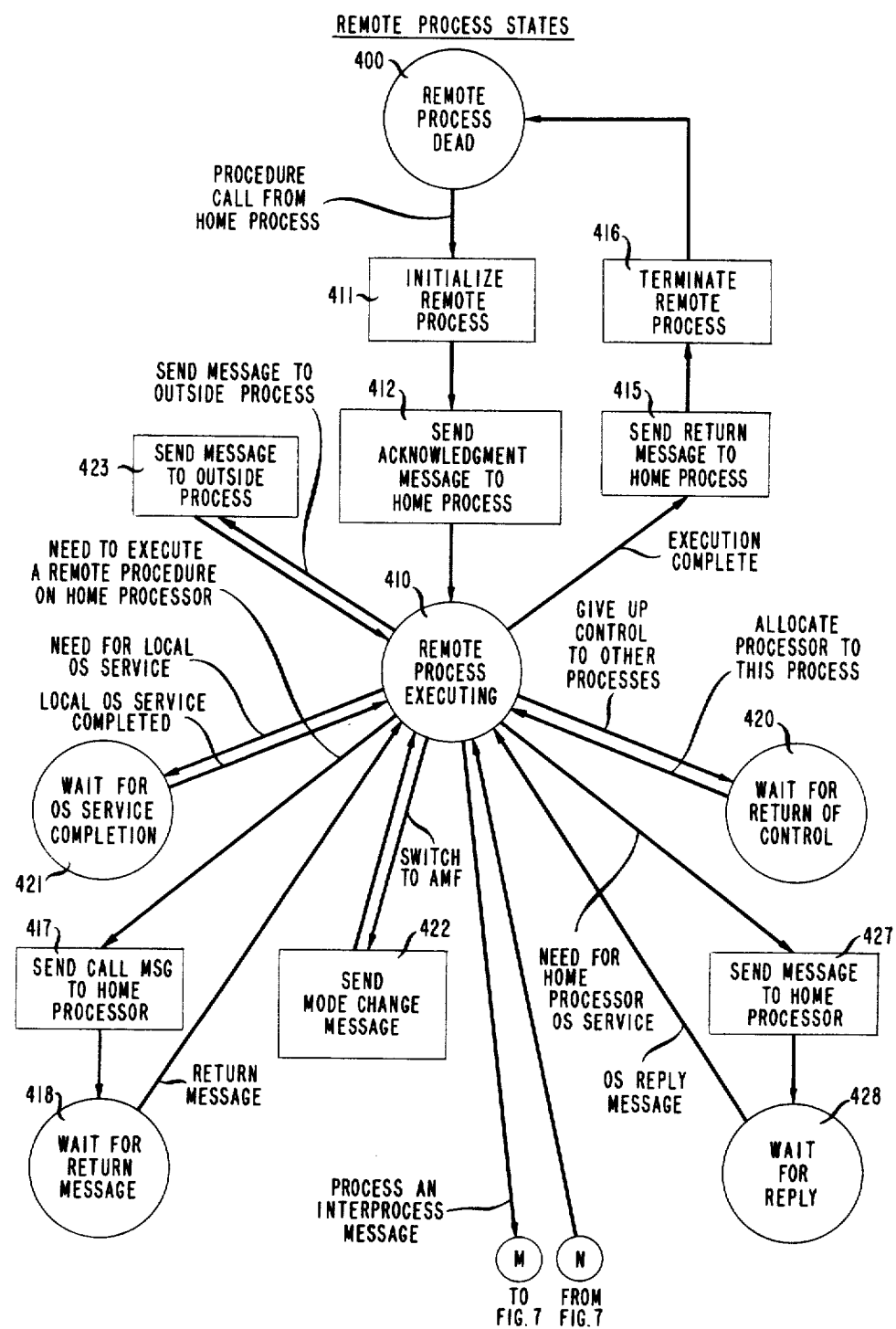
FIGS. 6 and 7 are state diagrams of process states, transitions and actions in the remote processor.
Figure 7:
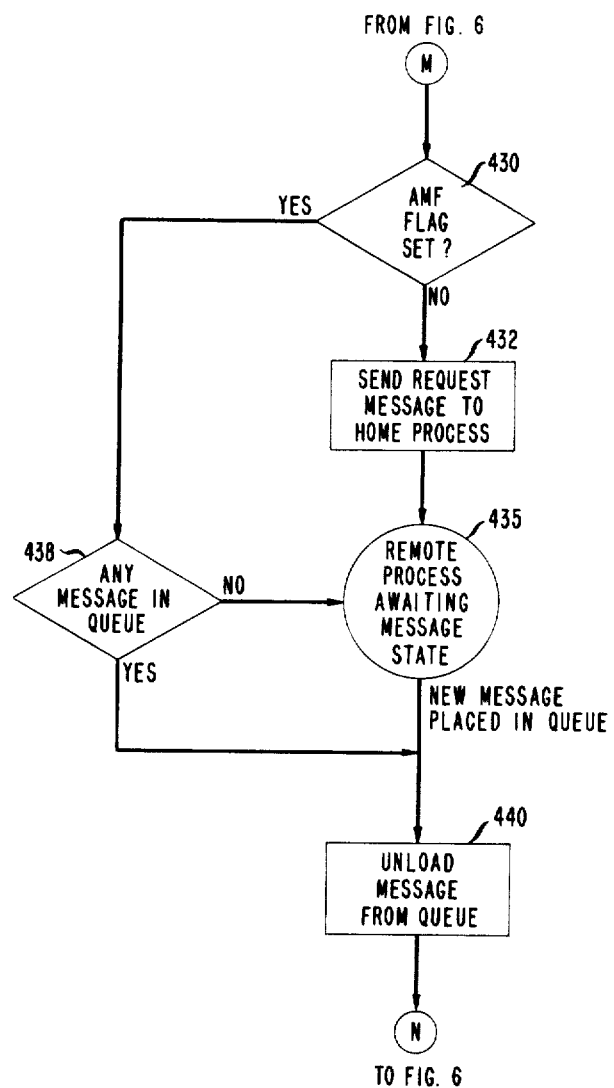

FIGS. 6 and 7 are state diagrams of the remote process. The remote process is originally in dead state 400 (FIG. 6) until a remote procedure call message calling for the execution of a remote program procedure on the remote processor is received. The operating system of the remote processor initializes (action box 411) the remote process in response to such a message and sends an acknowledgment message (action box 412) to the home process.

The initialization also includes allocation of a process control block 270 (FIG. 2), stack 280, and message queue 290. Pointers 273 to the stack, and 274 to the message queue are initialized. The type of process 275, state of process 276, home processor number 277 and home process identification 278 are initialized on the basis of data supplied in the remote procedure call message. The return address data 272 is set up whenever the remote process goes into a wait state. The initialization also includes the assignment by the remote processor operating system of process identification 271 (FIG. 3) to the remote process; the remote process identification is sent back to the home processor in the acknowledgement message.

As previously indicated, the home process responds to the reception of an acknowledgment message by going into dormant state 350 (FIG. 5). After initialization, the remote process enters the execution state 410. When the remote process has completed executing the remote program procedure, it sends a return message (action box 415) to the home process, which then emerges from the dormant state 350 (FIG. 5) and reenters the executing state 320 (FIG. 4). Thereafter, the remote process is terminated (action box 416) in the remote processor and the remote process goes to the dead state 400.

The remote process is generally in the active status from the time it is initialized until it is terminated. While the process is in the active status in the remote processor, it may leave the executing state 410. For example, there may be a need to give control of the remote processor to other processes in which case the remote process goes from the executing state 410 to the "wait for return of control" state 420. When the processor is reallocated to the remote process, execution state 410 is reentered. While in the executing state 410, the remote process may need a local operating system (OS) service such as the advance allocation of more processor time; the service is requested and the remote process goes into wait state 421 until the service is completed at which time the remote process goes back to the executing state 410.

Figure 8:
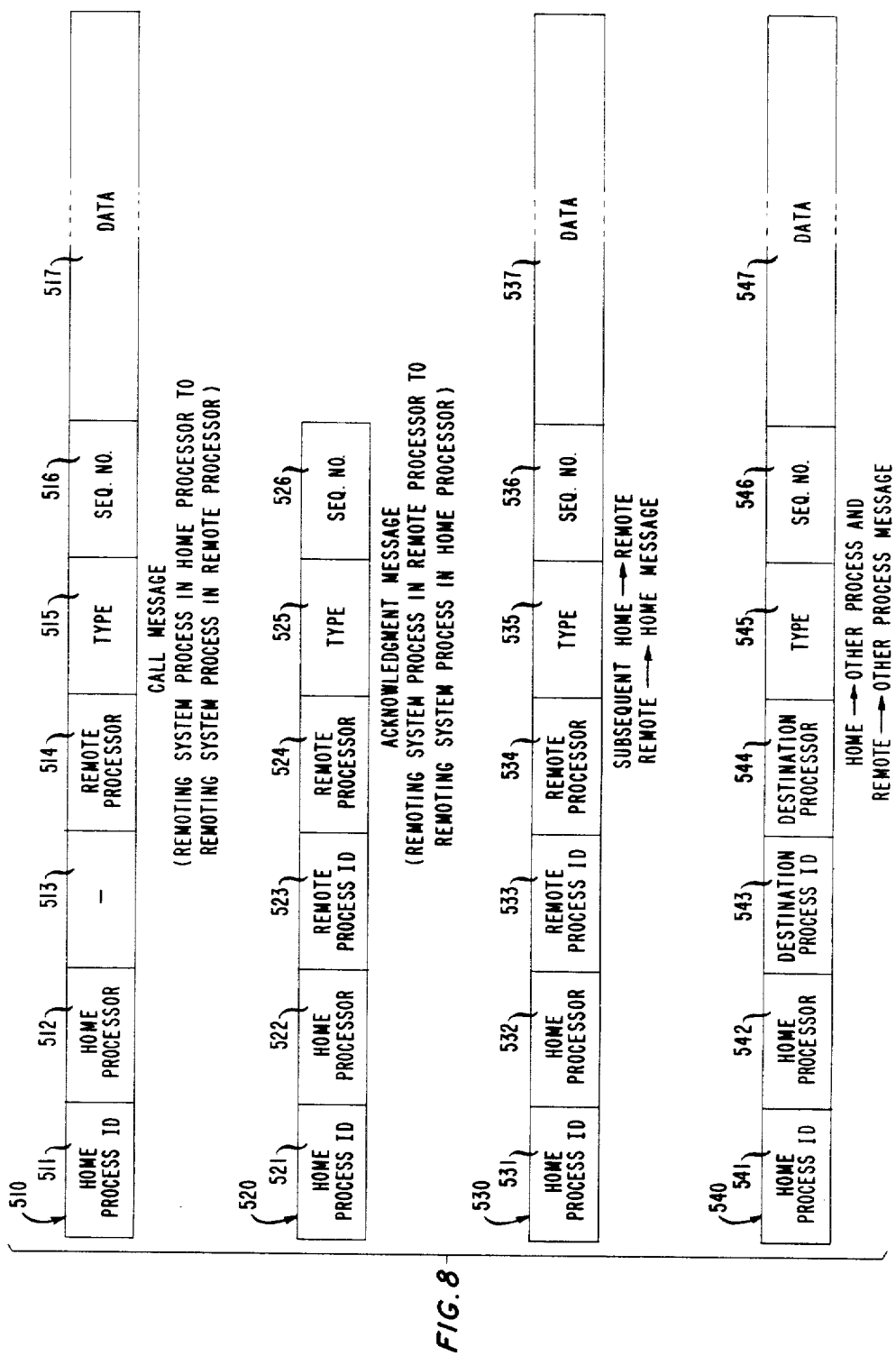
FIG. 8 depicts message formats for messages between the home processor and remote processor, and between the process and other processes.

In addition, while in the active status, the remote process may send messages to the home process. One such message is the mode change message, which is sent (action box 422) to switch from message forwarding on demand to automatic message forwarding (AMF). The AMF flage 279 (FIG. 3) of the remote process control block 270 is set at the time the mode change message is generated. After the mode change message has been sent, execution state 410 is reentered. As previously discussed, the home processor responds to the mode change message by setting the AMF flag 229 (FIG. 2) and the AMF filter categories 219 specifiable in the data field 537 of the mode change message 530 (FIG. 8).

Certain operating system (OS) services, such as timing, are best accomplished using the OS services of the home processor. When a home processor OS service is needed, a message is sent (action box 427) to the home processor and the remote processor goes into a wait for reply state 428. When a message is received that the OS service has been provided, the remote process returns to the execution state 410.

When the remote process recognizes the need to send a message to an outside process, it sends such a message (action box 423). In accordance with the present embodiment, outside processes send all messages for the subject process to the home processor and home process. This avoids race conditions and process identification updating problems. Accordingly, a message to an outside process identifies the home process and home processor as the source of the message. The identities of the home processor and process were previously stored in locations 277, 278 of the process control block 270 (FIG. 3) of the remote processor during remote process initialization. The outside process then sends any response messages to the home processor and process. In alternative embodiments, it is possible to send interprocess messages from the remote process by means of a special type of message, first to the home process, to be retransmitted by the home processor to the outside processor and process defined in the message. The bulk of the message to be transmitted is conveyed in the data field 537 of a message in format 530 (FIG. 8). The data field must convey all information necessary for later retransmission of the message.

A procedure being executed on a remote process can call for the execution of another procedure on the home processor. For example, a second procedure may be called to supply data needed by the remote procedure. The second procedure call is initiated by sending the procedure call message (action box 417) and placing the remote process in the "wait for return message" state 418. When the home process has executed this procedure, it sends a return message to the remote process which then goes back to the executing state 410.

The home process executes the second procedure in the following way: while in dormant state 350 (FIG. 5), it receives a call message from the remote process and leaves the dormant state via exit point C to enter executing state 320 (FIG. 4). After execution has been completed, the home process leaves executing state 320 via exit point D, sends a return message to the remote processor via action box 354 (FIG. 5), and goes back to dormant state 350.

When the remote process makes such a procedure cell and goes into "wait for return message" state 418, it goes into an inactive, though not dead, status. The home process, executing the second procedure, is then active. When the home process has completed execution of the second procedure, it goes back to the remoting status, and the remote process goes back to the active status.

Figure 3:
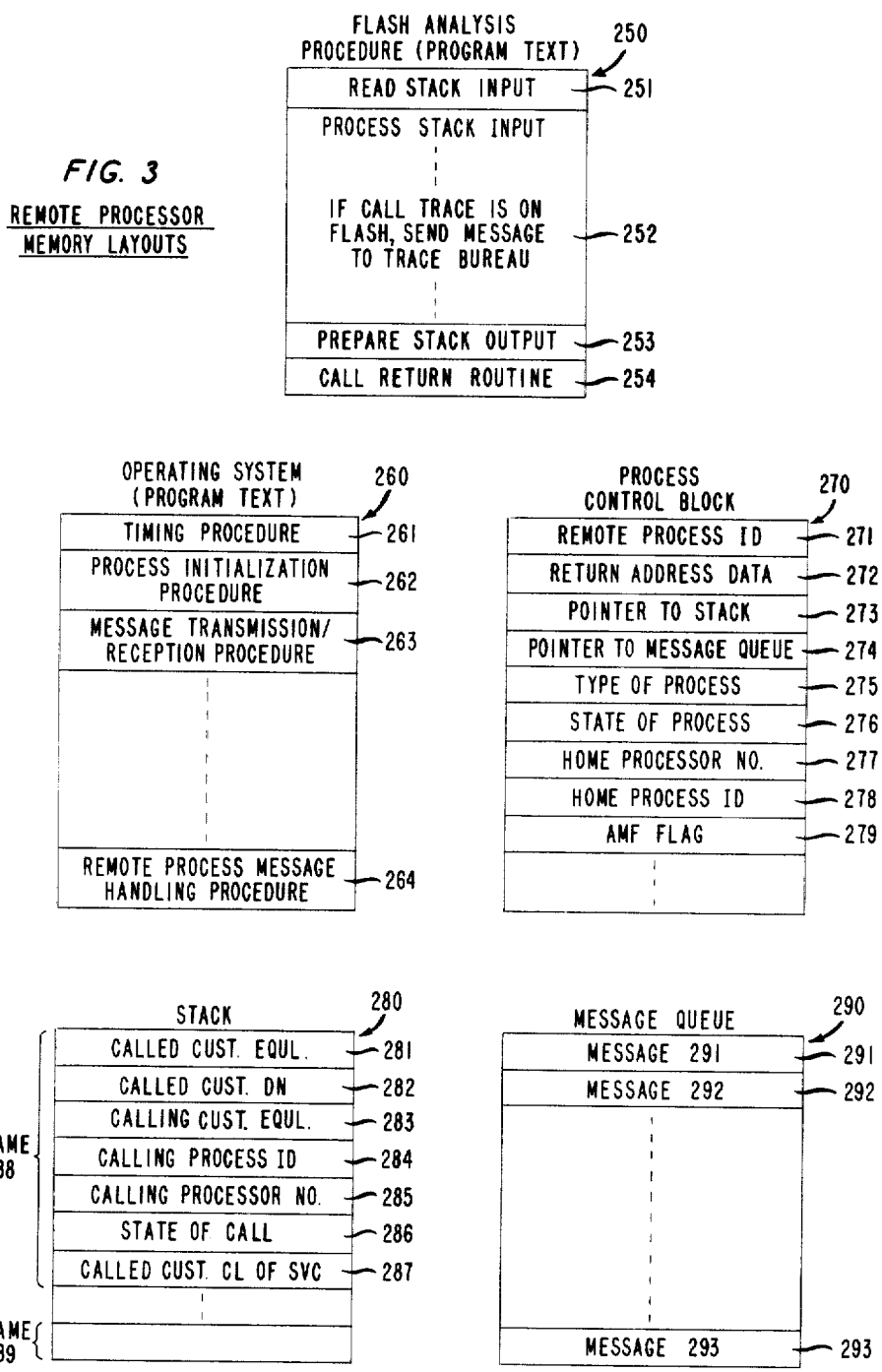

When during the process of executing (state 410, FIG. 6) a remote procedure, the remote process encounters the need for further information, it looks for messages from other processes (via exit point M to FIG. 7). Since the home processor uses two different methods of forwarding messages to the remote process, the remote process uses two corresponding methods to look for such messages. A test 430 is made to determine if the automatic message forwarding flag 279 (FIG. 3) is set. When the AMF flag is not set, the message forwarding on demand mode exists, and the remote processor sends a message to the home process (action box 432) requesting that another message be sent to the remote process. Thereafter, the remote process goes into the "awaiting message" state 435, in which it is primed to await reception of a message. When the test 430 indicates that the automatic message forwarding flag is set, the remote process checks via test 438 for messages in its own queue 290 (FIG. 3). When a message is present in the queue 290, it is unloaded (action box 440) and process execution continues via exit point N to execution state 410 (FIG. 6). When no messages are in the queue 290, the remote process is primed to await reception of a message by going into the "awaiting message" state 435. Thereafter, when a message is received in the remote process's queue 290, the message is unloaded via action box 440, and process execution continues by returning the process via exit point N to execution state 410 (FIG. 6).

Intraprocess and interprocess message formats are illustrated in FIG. 8. A remote procedure call message 510 includes the home process identification number 511, the home processor number 512, the remote processor number 514, the type of message 515, a sequence number 516 and a variable length data field 517. The remote process identification number 513 is missing because this message is used before the operating system of the remote processor has assigned it. The sequence number 516 is initially assigned and thereafter incremented as each new message is transmitted from a given source to a given receiver. Every message that is received is checked for the next consecutive sequence number to ensure that no messages have been lost or received out of sequence.

Acknowledgment message format 520 includes the home process identification number 521, home processor number 522, remote process identification number 523 (which has now been assigned by the remote processor), remote processor number 524, message type 525 and sequence number 526. No other data is required at this time so that no data field is needed.

Subsequent intraprocess messages follow the format of 530, including the home process indentification number 531, home processor number 532, remote process identification number 533, remote processor number 534, message type 535, sequence number 536 and data field 537.

Interprocess messages follow the format of 540. Even if these messages are sent from a remote processor, the home process identification number 541 and home processor number 542 are sent as the identity of the source of the message, since in the present embodiment, all outside processes send messages only to the home processor.

Table I is a summary of some of the types of messages used in this system.

TABLE I

Remote Procedure Call
Acknowledgment of Procedure Call
Request for Home Processor OS Service
Response to OS Service Request
Request for a Message
Mode Change Message
Procedure Return Message
Message to Outside Process Requesting Data
Message to Outside Process Returning Data The nature of the messages of Table I is discussed elsewhere herein.

The principles of this invention are illustrated in the framework of the telecommunication system of FIG. 1 by considering a special type of telephone call. Interface module processor 100 is one of several processors such as 101 and 102 which are connected to switch modules, e.g., 111, connected to customer lines. Central processor 120 has resources available for use by any interface module processor upon request.

A common method for a telephone customer to signal special requests in a telecommunication system is to depress the switch hook of a telephone instrument briefly. This is called a flash and is detected by a connected switch controller 110 (FIG. 1).

One potential application of the use of a flash is to identify the originators of unwanted and annoying telephone calls. In this application, the detection of a flash from the called telephone customer of such a conversation indicates that the identity of the calling customer should be recorded and displayed at an appropriate centralized trace bureau. Customers who have been receiving annoying telephone calls may be suitably identified in the system in order to receive this service by means of a special class of service indication. In this example, a customer who has this service is connected to switch module 111 served by processor 100.

In this exemplary telecommunication system, the setting up and monitoring of a telephone connection is the joint task of two processes, a calling and a called customer telephone connection process, controlled by the interface module processor of the calling customer, and the called customer, respectively. In the example, the calling customer is attached to switch module 116 controlled by processor 102. The interface module processor 100 is the home processor for the called customer telephone connection process, the subject process of this example, which is shown in block 200 (FIG. 2). When the conversation has reached the talking stage, the process state 226 associated with that connection is the talking state. The procedure monitoring the call in the talking state is procedure 203. Before reaching the talking state a call set up procedure was performed to establish a connection between the called and calling customers. During the call set up procedure the following call related information was accumulated and stored in locations 231–237 of stack 230: the called customer equipment location 231, called customer directory number 232, calling customer equipment location 233, calling customer telephone connection process identification 234, calling customer processor number 235, the state of the call 236, and the class of service of the called customer 237. This data, which forms frame 238, the last frame of stack 230, is transmitted to the remote processor as part of the data field 517 of the remote procedure call message 510 (FIG. 8).

When a flash is detected while the process is monitored by procedure 203, a flash analysis procedure must be called. This procedure is very complex and infrequently used. To save system resources, this procedure is stored and executed in central processor 120 (FIG. 1), the remote processor of this example. This procedure is therefore called from a remote procedure call from the home process (action box 349, FIG. 5). When an acknowledgment message is received, the home process goes into the dormant state 350.

Before receiving the remote procedure call message, the remote process is in dead state 400 (FIG. 6) with no associated memory. When the procedure call message is received, memory is allocated for the execution of a remote process, and the remote process is initiated and goes into executing state 410. An acknowledgment message is sent back to the home process (action box 412), and execution of the flash analysis procedure 250 (FIG. 3) is begun by remote processor 120 (FIG. 1). The procedure call message from the home processor contains in its data portion 517 (FIG. 8) the contents of locations 231–237 of stack 230. The data portion of the procedure call message is stored in locations 281–287 of stack 280 of the remote processor by the initialization procedure 262 of the remote processor operating system 260.

The remote process controls execution of the flash analysis procedure 250. In procedure 250 the remote process reads the data in the stack 280 and examines the class of service indication 287 of the called customer. The remote procedure 250 recognizes in step 252 that in this case the flash signifies that the call is to be traced and the identities of the calling and called customers are to be displayed and recorded at the centralized trace bureau. The centralized trace bureau is connected to the other end of a data link 128, controlled by processor 120 (FIG. 1).

The flash analysis procedure also recognizes the need to generate the calling customer directory number which is required by the trace bureau and which is not available in the stack. This number can be provided by the associated calling customer telephone connection process in interface module processor 102 which controls the calling customer part of the telephone call. The stack 280 contains the identity of the calling customer process at location 284 and the identity of the calling customer processor at location 285. The flash analysis procedure sends a message (action box 423, FIG. 6) to the calling customer telephone connection process in processor 102, specifying the home process and home processor 100, found in locations 278 and 277 of the process control block 270 as the source of the message, and requesting the directory number of the calling customer. The remote process sets AMF flag 279 and sends a mode change message to the home processor (action box 422) asking that the home process set the automatic message fowarding flag 229, and specifying a filter category to be stored in location 219 of process control block 220. The requested category in this case defines that only messages from the calling customer process and processor are to be sent to the remote process. The remote process then goes via exit M, and tests 430 and 438 to the remote process awaiting message state 435 (FIG. 7).

When processor 102 receives the message requesting the directory number of the calling customer, it passes this message to the calling customer process. This process, which has recorded the calling customer's directory number in its own stack, generates a message, including the requested directory number in the message data field 547, to the home process in the home processor. The message is transmitted over data link 130 to the home processor 100 under the control of the operating system of processor 102. The operating system of processor 100 then loads the message from processor 102 to the home process in message queue 240 (FIG. 2), and notifies the home process that a message has been received. The home process emerges from state 350 (FIG. 5), recognizes that the automatic message forwarding (AMF) flag is set via test 389, recognizes that the message is to be filtered via test 390, recognizes that the message passes the filter via test 391 and transmits the message to the remote processor (action box 395). Thereafter, the home process goes back into dormant state 350.

The remote processor 120 receives the message from processor 102 transmitted via the home processor as described above. The message is queued by the operating system of processor 120 in message queue 290. The remote process emerges from state 435 (FIG. 7), unloads the message from the queue (action box 440), and goes back to the execution state 410 (FIG. 6).

The flash analysis procedure of the remote process then generates data for a message to the trace bureau indicating the type of message and the directory numbers of the calling and called customers involved. The flash analysis procedure sends a message (action box 423) containing this data to an administrative system process resident in the central (remote) processor 120. The administrative system process sends a special data message containing the calling and called customer identification information to the trace bureau using I/O controller 121 to control data link 128 connnected to that bureau.

After the remote process has sent the trace message to the administrative system process, it sends a return message (action box 415) to the home processor. The remote process is then terminated (action box 416), and goes to the dead state 400. The message to the home process is an indication that no further action is required and that the home process can go from the dormant state 350 back to active execution state 320 associated, in this case, with monitoring the called customer of a telephone connection in the talking state.

Figure 9:
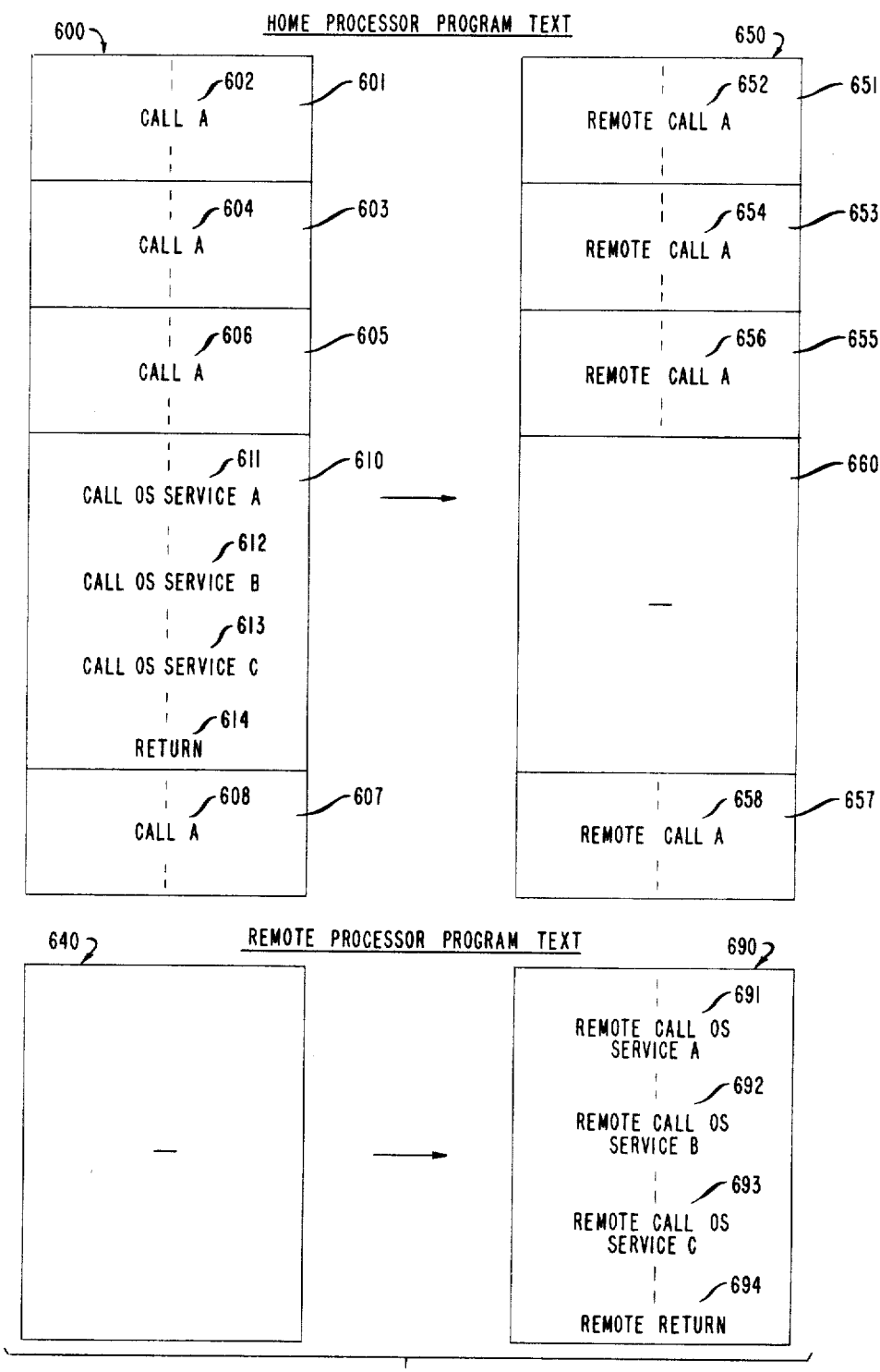
FIG. 9 depicts blocks of memory for a process including a selected procedure arranged for execution in the home processor, and that same process with the selected procedure arranged for execution in the remote processor.

A desirable attribute of this invention is that a particular procedure may be moved for execution on a remote processor without recording the source text of the procedure. The process for accomplishing such a move can be understood by referring to FIG. 9 which represents the program text of a process 600 first with the text of procedure A in the home processor, then as process 650 arranged to execute procedure A on the remote processor.

The original text of process 600 includes procedures 601, 603, 605, 607, and 610. Procedure A shown in block 610 is invoked by the other procedures by the call statements Call A 602, 604, 606 and 608. Procedure A has internal calls for OS service A (611), OS service B (612), OS service C (613), and has a return statement 614. In the remote processor, the memory block 640, corresponding to a block to be occupied by the program text of procedure A, is shown as a blank.

When procedure A is remoted to the remote processor, all calls for procedure A are changed to remote calls for procedure A. The modified process 650, comprising procedures 651, 653, 655, and 657 corresponds to process 600 comprising the corresponding procedures 601, 603, 605, and 607. Procedure A which had occupied block 610 is eliminated in process 650 and is represented by blank space 660. Corresponding to the previous calls 602, 604, 606, 608 for procedure A are new remote calls 652, 654, 656, 658 for procedure A. Procedure A is moved to the remote processor in block 690. The calls 611, 612, 613 for OS services A, B, and C have been replaced by remote calls 691, 692, 693 for OS Services. Similarly, the return 614 has been replaced by a remote procedure return 694. The remote calls, remote returns, and remote calls for OS services invoke remote execution operating system procedures which generate the appropriate intraprocess messages and perform the appropriate initialization of the remote process. Alternatively, the remote calls could be implemented by simple calls to a common subroutine which invokes the remote execution operating system procedures. Note that not all OS service calls need to be remote OS service calls, just those for which it is undesirable to call for a local OS service, e.g., timing indications.

The transition from the configuration represented by memory blocks 600 and 640 to that represented by memory blocks 650 and 690 is implemented by an editing or preprocessing operation followed by a new link editing operation. The process is also reversible, i.e., a remote procedure may be made part of the home process, by performing the reverse operations; this can be accomplished even when changes have been made in the remote procedure after it was originally remoted. The techniques for carrying out such operations are well known in the art.

It is to be understood that the above-described embodiment is merely illustrative of the principles of this invention. Other arrangements may be devised by those skilled in the art without departing from the spirit and scope of the invention.

What is claimed is:

1. In a multiprocessor system for executing a plurality of processes in which a process identification is associated with each of said plurality of processes, a method of executing a subject process in more than one processor, comprising the steps of:

controlling execution of said subject process in a first processor;

transmitting selected procedure call data from said first processor to a second processor specifying arguments needed to execute a selected procedure of said subject process;

executing said selected procedure of said subject process in said second processor in response to said selected procedure call data;

transmitting interprocess messages destined for said selected procedure to said first processor, said interprocess messages comprising the identification of said subject process;

receiving said interprocess messages in said first processor;

transmitting selected procedure return data comprising data generated by said selected procedure from said second processor to said subject process in said first processor at the completion of execution of said selected procedure; and continuing execution of said subject process in said first processor in response to said selected procedure return data.

2. The method of claim 1 in which said step of receiving said interprocess messages further comprises the step of:

storing said interprocess messages in said first processor;

and said method of executing a subject process further comprises the steps of:

transmitting a request message from said second processor to said first processor requesting transmission to said second processor of one of said interprocess messages and transmitting a predetermined one of said interprocess messages from said first processor to said second processor in response to said request message during execution of said selected procedure by said second processor.

3. The method of claim 2 in which said step of transmitting said predetermined one of said interprocess messages further comprises the steps of:

transmitting said predetermined one of said interprocess messages stored in said first processor to said second processor when there is an interprocess message stored in said first processor;

priming said first processor when no interprocess message is stored in said first processor to automatically transmit a subsequently received interprocess message to said second processor; and transmitting said subsequently received interprocess message to said second processor.

4. The method of claim 3 further comprising the steps of:
- transmitting a mode change message from said second processor to said first processor;
- automatically transmitting in response to said mode change message, selected ones of said interprocess messages received subsequent to said mode change message from said first processor to said second processor; and
- receiving said interprocess messages in said second processor.

5. The method of claim 1 further comprising the step of transmitting said interprocess messages to said second processor during execution of said selected procedure by said second processor.

6. The method of claim 1 in which said step of receiving said interprocess messages further comprises the step of:
- storing said interprocess messages in said first processor; and the method of executing a subject process further comprises the steps of:
- transmitting said interprocess messages stored in said first processor from said first processor to said second processor; and
- receiving said interprocess messages in said second processor during execution of said selected procedure by said second processor.

7. The method of claim 1 in which said step of receiving said interprocess messages further comprises the step of:
- storing said interprocess messages in said first processor; and the method of executing a subject process further comprises the steps of:
- defining at least one category of said interprocess messages as a category of messages to be transmitted from said first processor to said second processor;
- transmitting the ones of said interprocess messages which are of a category defined in said defining step to said second processor; and
- receiving in said second processor said ones of said interprocess messages transmitted to said second processor during execution of said selected procedure by said second processor.

8. The method of claim 1 in which said subject process is in one state of a set of possible states for that process, and in which said step of receiving said interprocess messages further comprises the step of:
- storing said interprocess messages in said first processor; and the method of executing a subject process further comprises the step of:
- defining at least one state of the set of possible states of said subject process;
- transmitting said interprocess messages to said second processor when said subject process is in a state defined in said defining step; and
- receiving in said second processor said interprocess messages transmitted to said second processor during execution of said selected procedure by said second processor.

9. In a multiprocessor system for controlling a telecommunications switching system, adapted to execute a plurality of processes in which a process identification is associated with each of said plurality of processes, a method of executing a subject process in more than one processor, comprising the steps of:
- controlling execution of said subject process in a first processor;
- transmitting selected procedure call data from said first processor to a second processor specifying arguments needed to execute a selected procedure of said subject process;
- executing said selected procedure of said subject process in said second processor in response to said selected procedure call data;
- transmitting interprocess messages destined for said selected procedure to said first processor, said interprocess messages comprising the identification of said subject process;
- receiving said interprocess messages in said first processor;
- transmitting selected procedure return data comprising data generated by said selected procedure from said second processor to said subject process in said first processor at the completion of execution of said selected procedure; and
- continuing execution of said subject process in said first processor in response to said selected procedure return data.

10. The method of claim 9 in which said step of receiving said interprocess messages further comprises the step of:
- storing said interprocess messages in said first processor; and said method of executing a subject process further comprises the steps of:
- transmitting a request message from said second processor to said first processor requesting transmission to said second processor of one of said interprocess messages; and
- transmitting a predetermined one of said interprocess messages from said first processor to said second processor in response to said request message during execution of said selected procedure by said second processor.

11. The method of claim 9 in which said step of receiving interprocess messages further comprises the step of:
- storing said interprocess messages in said first processor; and the method of executing a subject process further comprises the steps of:
- transmitting said interprocess messages stored in said first processor from said first processor to said second processor; and
- receiving said interprocess messages in said second processor during execution of said selected procedure by said second processor.

12. The method of claims 1, 2, 3, 4, 5, 6, 7, 8, 9, 10, or 11, further comprising the steps of:
- assigning a first process identification to said subject process in said first processor;
- assigning a second process identification to said selected procedure in said second processor; and
- transmitting from said second processor to another process an interprocess message generated by said selected procedure and identified with said first process identification.

13. The method of claims 1, 2, 3, 4, 5, 6, 7, 8, 9, 10, or 11 further comprising the steps of:
- transmitting other selected procedure call data from said second processor to said first processor specifying arguments needed to execute another selected procedure of said subject process;
- executing said other selected procedure by said first processor in response to said other selected procedure call data;

transmitting other selected procedure return data comprising data generated by said other selected procedure from said first processor to said second processor at the completion of execution of said other selected procedure; and continuing execution of said selected procedure in said second processor.

14. The method of claims 1, 2, 3, 4, 5, 6, 7, 8, 9, 10, or 11 in which said subject process has an associated data stack in said first processor and in which said selected procedure call data comprises the last frame of said data stack associated with said subject process in said first processor.

15. The method of claims 1, 2, 3, 4, 5, 6, 7, 8, 9, 10, or 11 in which said step of executing said selected procedure further comprises the steps of:

generating a message to another process;

transmitting said message to another process to said first processor; and transmitting said message to another process from said first processor to said other process.

16. The method of claims 1, 2, 3, 4, 5, 6, 7, 8, 9, 10, or 11 in which said step of executing said selected procedure further comprises the steps of:

generating and transmitting an operating system request message to said first processor requesting a specified operating system service;

performing in said first processor an operating system service in response to said operating system request message; and generating and transmitting by said first processor an operating system response message to said second processor.

17. A distributed multiprocessor system for executing a plurality of processes in which a process identification is associated with each of said plurality of processes comprising:

a first processor for controlling execution of a subject process, said first processor comprising means for receiving interprocess messages destined for a selected program procedure of said subject process, said interprocess messages comprising the identification of said subject process and transmitted to said subject process, said first processor operative under program control to generate and transmit procedure call data requesting a second processor to execute said selected program procedure of said subject process and specifying data required to execute said selected program procedure;

means for transmitting said interprocess messages to said first processor;

said second processor being responsive to said procedure call data for executing said selected program procedure, for generating return data comprising results of such execution, and for transmitting said return data to said first processor; and said first processor being adapted to respond to said return data by continuing the execution of said subject process.

18. The multiprocessor system of claim 17 further comprising:

means in said first processor for storing said interprocess messages; and means for transmitting said interprocess messages stored in said first processor to said second processor during execution of said selected procedure by said second processor.

19. A distributed multiprocessor system for controlling a telecommunications switching system, adapted to execute a plurality of processes in which a process identification is associated with each of said plurality of processes, comprising:

a first processor for controlling execution of a subject process, said first processor comprising means for receiving interprocess messages destined for a selected program procedure of said subject process, said interprocess messages comprising the identification of said subject process and transmitted to said subject process, said first processor operative under program control to generate and transmit procedure call data requesting a second processor to execute said selected program procedure of said subject process and specifying data required to execute said selected program procedure;

means for transmitting said interprocess messages to said first processor;

said second processor being responsive to said procedure call data for executing said selected program procedure, for generating return data comprising results of such execution, and for transmitting said return data to said first processor; and said first processor being adapted to respond to said return data by continuing execution of said subject process.

20. The multiprocessor system of claim 19 further comprising:

means in said first processor for storing said interprocess messages; and means for transmitting said interprocess messages stored in said first processor to said second processor while said second processor is executing said selected procedure.

21. The multiprocessor system of claims 17, 18, 19, or 20, further comprising:

means for assigning a first process identification to said subject process in said first processor;

means for assigning a second process identification to said selected procedure in said second processor; and means for transmitting from said second processor to another process an interprocess message generated by said selected procedure and identified with said first process identification.

22. In a multiprocessor system for executing a plurality of processes, comprising operating systems associated with each of the processors of said multiprocessor system, one of said plurality of processes being a subject process, said subject process including a calling procedure comprising an intraprocessor procedure call for the execution of a selected procedure, said selected procedure including a call for an operating system service and an intraprocessor procedure return to said calling procedure, a method of changing program text of said subject process to allow for the execution of said subject process in a first processor and the execution of said selected procedure in a second processor, comprising the steps of:

substituting a remote procedure call for said intraprocessor procedure call;

modifying program text of said selected procedure to call for a remote operating system service and to substitute a remote procedure return for said intraprocessor procedure return;

storing said modified program text of said selected procedure in said second processor.

23. The method of claim 22 in which each process and each processor of said multiprocessor system is identified with an identification number, and in which said modifying step further comprises the step of modifying said program text to control said second processor to transmit interprocess messages comprising the identification of said subject process and the identification number of said first processor to define the source of said interprocess messages.

* * * * *